US009274695B2

(12) United States Patent
Ellenich et al.

(10) Patent No.: US 9,274,695 B2
(45) Date of Patent: Mar. 1, 2016

(54) PARALLAX SCROLLING OF MULTIPLE INFORMATION PANELS IN A GRAPHICAL USER INTERFACE

(71) Applicants: John Jacob Ellenich, San Francisco, CA (US); Robert Theodore Derstadt, Boulder, CO (US)

(72) Inventors: John Jacob Ellenich, San Francisco, CA (US); Robert Theodore Derstadt, Boulder, CO (US)

(73) Assignee: JIVE SOFTWARE

( * ) Notice: Subject to any disclaimer, the term of this patent is extended or adjusted under 35 U.S.C. 154(b) by 145 days.

(21) Appl. No.: 13/867,008

(22) Filed: Apr. 19, 2013

(65) Prior Publication Data

US 2014/0317556 A1 Oct. 23, 2014

(51) Int. Cl.
*G06F 3/048* (2013.01)
*G06F 3/0485* (2013.01)
*G06F 3/0481* (2013.01)
*G06F 3/0488* (2013.01)
*G09G 5/14* (2006.01)
*G09G 5/34* (2006.01)

(52) U.S. Cl.
CPC ............ *G06F 3/0485* (2013.01); *G06F 3/0481* (2013.01); *G06F 3/04883* (2013.01); *G06F 3/04855* (2013.01); *G06F 2203/04803* (2013.01); *G09G 5/14* (2013.01); *G09G 5/34* (2013.01)

(58) Field of Classification Search
CPC . G06F 3/0481; G06F 3/0485; G06F 3/04855; G09G 5/14; G09G 5/34
See application file for complete search history.

(56) References Cited

U.S. PATENT DOCUMENTS

| | | | | |
|---|---|---|---|---|
| 8,799,775 B2* | 8/2014 | Weeldreyer | ........... | G06F 17/214 715/255 |
| 2006/0143574 A1* | 6/2006 | Ito | ........... | G06F 3/04817 715/800 |
| 2007/0136677 A1* | 6/2007 | Agarwal | ........... | 715/767 |
| 2008/0155473 A1* | 6/2008 | Duhig | ........... | G06F 3/0482 715/818 |
| 2010/0083165 A1* | 4/2010 | Andrews | ........... | G06F 1/1626 715/784 |
| 2010/0141589 A1* | 6/2010 | Hoover | ........... | G06F 3/0425 345/173 |
| 2012/0246596 A1* | 9/2012 | Ording et al. | ........... | 715/799 |
| 2012/0299933 A1* | 11/2012 | Lau et al. | ........... | 345/473 |
| 2014/0129988 A1* | 5/2014 | Liang et al. | ........... | 715/838 |
| 2014/0215383 A1* | 7/2014 | Park-Ekecs et al. | ........... | 715/784 |

* cited by examiner

*Primary Examiner* — Doon Chow
*Assistant Examiner* — Shourjo Dasgupta
(74) *Attorney, Agent, or Firm* — Arjomand Law Group

(57) ABSTRACT

A method and a device are disclosed including a parallax Graphical User Interface (GUI) software component configured to allow automatic, parallax-type, smooth movement of multiple information panels out of user's view when focus is placed on one of the multiple information panels and the focus information panel is scrolled. When the user scrolls in the opposite direction, the non-focus panels reappear smoothly and automatically and the original user view before scrolling is restored. In various embodiments, search results may be categorized and organized into separate windows, each independently scrollable, which may be viewed using the parallax GUI. In various embodiments, a number of documents and/or software applications used to open such documents, may be registered in a parallax list to allow navigation using the parallax GUI.

18 Claims, 7 Drawing Sheets

PARALLAX SCROLLING OF MULTIPLE INFORMATION PANELS IN A GRAPHICAL USER INTERFACE

TECHNICAL FIELD

This application relates generally to Graphical User Interface (GUI). More specifically, this application relates to automatic scrolling of multiple information panels when scrolling one of the multiple information panels.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
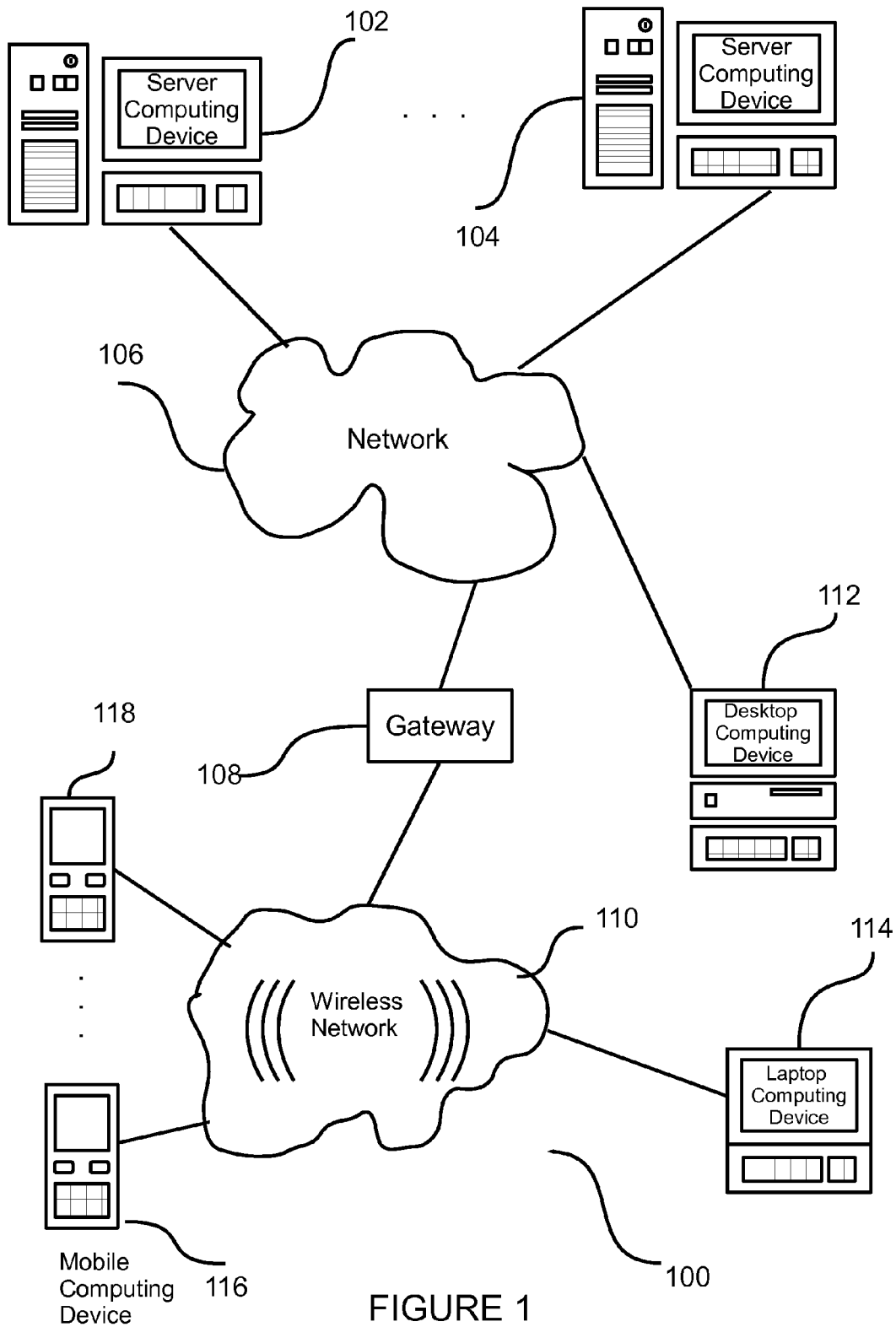
FIG. 1 shows an embodiment of a network computing environment wherein the disclosure may be practiced.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while following description references particular touch-sensitive screens and computing devices such as mobile and tablet devices, it will be appreciated that the disclosure may be used with non-touch screens and other computing devices such as desktop computers, and the like.

Briefly described, a device and a method are disclosed including a parallax Graphical User Interface (GUI) software component configured to allow automatic, parallax-type, smooth movement of multiple information panels out of user's view when focus is placed on one of the multiple information panels and the focus information panel is scrolled. When the user scrolls in the opposite direction, the non-focus panels reappear smoothly and automatically and the original user view before scrolling is restored. In various embodiments, search results may be categorized and organized into separate windows, each independently scrollable, which may be viewed using the parallax GUI. In various embodiments, a number of documents and/or software applications used to open such documents, may be registered in a parallax list to allow navigation using the parallax GUI.

With the ubiquity of computing devices with rich GUI, such as powerful smartphones, laptop computers, computing pads and tablets, among others, and widely available high speed computer networks, access to information is easier than ever. However, the hidden cost of this ease of access to information is the abundance of irrelevant information and the difficulty of finding useful information. Furthermore, with powerful search engines for the Internet or vast enterprise intranets, simple searches return masses of data, many of which are relevant and valuable. However, with the limited screen size of various computing devices, the user may only see a fraction of such information at a given time. Often, to examine the information presented as a result of a search or other action, the user needs to scroll up and down and/or left and right in a graphic window or information panel to see currently invisible parts of documents or results.

In some applications, multiple overlapping graphical windows may be open on a device and sorting through them to find the right one can be cumbersome, distracting, and time consuming. Also, on a small screen such as the screen on a mobile device like a smartphone, selecting graphical control elements with a relatively large human fingertip can cause errors selecting the wrong controls or bringing the wrong window into focus unintentionally.

Therefore, automatically and smoothly getting secondary windows out of the way of the focus window on which the user is focusing currently can be highly valuable.

Illustrative Operating Environment

FIG. 1 shows components of an illustrative environment in which the disclosure may be practiced. Not all the shown components may be required to practice the disclosure, and variations in the arrangement and type of the components may be made without departing from the spirit or scope of the disclosure. System 100 may include Local Area Networks (LAN) and Wide Area Networks (WAN) shown collectively as Network 106, wireless network 110, gateway 108 configured to connect remote and/or different types of networks together, client computing devices 112-118, and server computing devices 102-104.

One embodiment of a computing device usable as one of client computing devices 112-118 is described in more detail below with respect to FIG. 2. Briefly, however, client computing devices 112-118 may include virtually any device capable of receiving and sending a message over a network, such as wireless network 110, or the like. Such devices include portable devices such as, cellular telephones, smart phones, display pagers, radio frequency (RF) devices, music players, digital cameras, infrared (IR) devices, Personal Digital Assistants (PDAs), handheld computers, laptop computers, wearable computers, tablet computers, integrated devices combining one or more of the preceding devices, or the like. Client device 112 may include virtually any computing device that typically connects using a wired communications medium such as personal computers, multiprocessor systems, microprocessor-based or programmable consumer electronics, network PCs, or the like. In one embodiment, one or more of client devices 112-118 may also be configured to operate over a wired and/or a wireless network.

Client devices 112-118 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphic may be displayed.

A web-enabled client device may include a browser application that is configured to receive and to send web pages, web-based messages, or the like. The browser application may be configured to receive and display graphic, text, multimedia, or the like, employing virtually any web based language, including a wireless application protocol messages (WAP), or the like. In one embodiment, the browser application may be enabled to employ one or more of Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client computing devices 12-118 also may include at least one other client application that is configured to receive content from another computing device, including, without limit, server computing devices 102-104. The client application may include a capability to provide and receive textual content, multimedia information, or the like. The client application may further provide information that identifies itself, including a type, capability, name, or the like. In one embodiment, client devices 112-118 may uniquely identify themselves through any of a variety of mechanisms, including a phone number, Mobile Identification Number (MIN), an electronic serial number (ESN), mobile device identifier, network address, such as IP (Internet Protocol) address, Media Access Control (MAC) layer identifier, or other identifier. The identifier may be provided in a message, or the like, sent to another computing device.

Client computing devices 112-118 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, to another computing device. However, the present disclosure is not limited to these message protocols, and virtually any other message protocol may be employed.

Client devices 112-118 may further be configured to include a client application that enables the user to log into a user account that may be managed by another computing device. Such user account, for example, may be configured to enable the user to receive emails, send/receive IM messages, SMS messages, access selected web pages, download scripts, applications, or a variety of other content, or perform a variety of other actions over a network. However, managing of messages or otherwise accessing and/or downloading content, may also be performed without logging into the user account. Thus, a user of client devices 112-118 may employ any of a variety of client applications to access content, read web pages, receive/send messages, or the like. In one embodiment, for example, the user may employ a browser or other client application to access a web page hosted by a Web server implemented as server computing device 102. In one embodiment, messages received by client computing devices 112-118 may be saved in non-volatile memory, such as flash and/or PCM, across communication sessions and/or between power cycles of client computing devices 112-118.

Wireless network 110 may be configured to couple client devices 114-118 to network 106. Wireless network 110 may include any of a variety of wireless sub-networks that may further overlay stand-alone ad-hoc networks, and the like, to provide an infrastructure-oriented connection for client devices 114-118. Such sub-networks may include mesh networks, Wireless LAN (WLAN) networks, cellular networks, and the like. Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), and any future generation radio access technologies for cellular systems, WLAN, Wireless Router (WR) mesh, and the like. Access technologies such as 2G, 3G, and future access networks may enable wide area coverage for mobile devices, such as client devices 114-118 with various degrees of mobility. For example, wireless network 110 may enable a radio connection through a radio network access such as Global System for Mobil communication (GSM), General Packet Radio Services (GPRS), Enhanced Data GSM Environment (EDGE), WEDGE, Bluetooth, High Speed Downlink Packet Access (HSDPA), Universal Mobile Telecommunications System (UMTS), Wi-Fi, Zigbee, Wideband Code Division Multiple Access (WCDMA), and the like. In essence, wireless network 110 may include virtually any wireless communication mechanism by which information may travel between client devices 102-104 and another computing device, network, and the like.

Network 106 is configured to couple one or more servers depicted in FIG. 1 as server computing devices 102-104 and their respective components with other computing devices, such as client device 112, and through wireless network 110 to client devices 114-118. Network 106 is enabled to employ any form of computer readable media for communicating information from one electronic device to another. Also, network 106 may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another.

Communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 106 may include any communication method by which information may travel between computing devices. Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

Illustrative Computing Device Configuration

Figure 2:
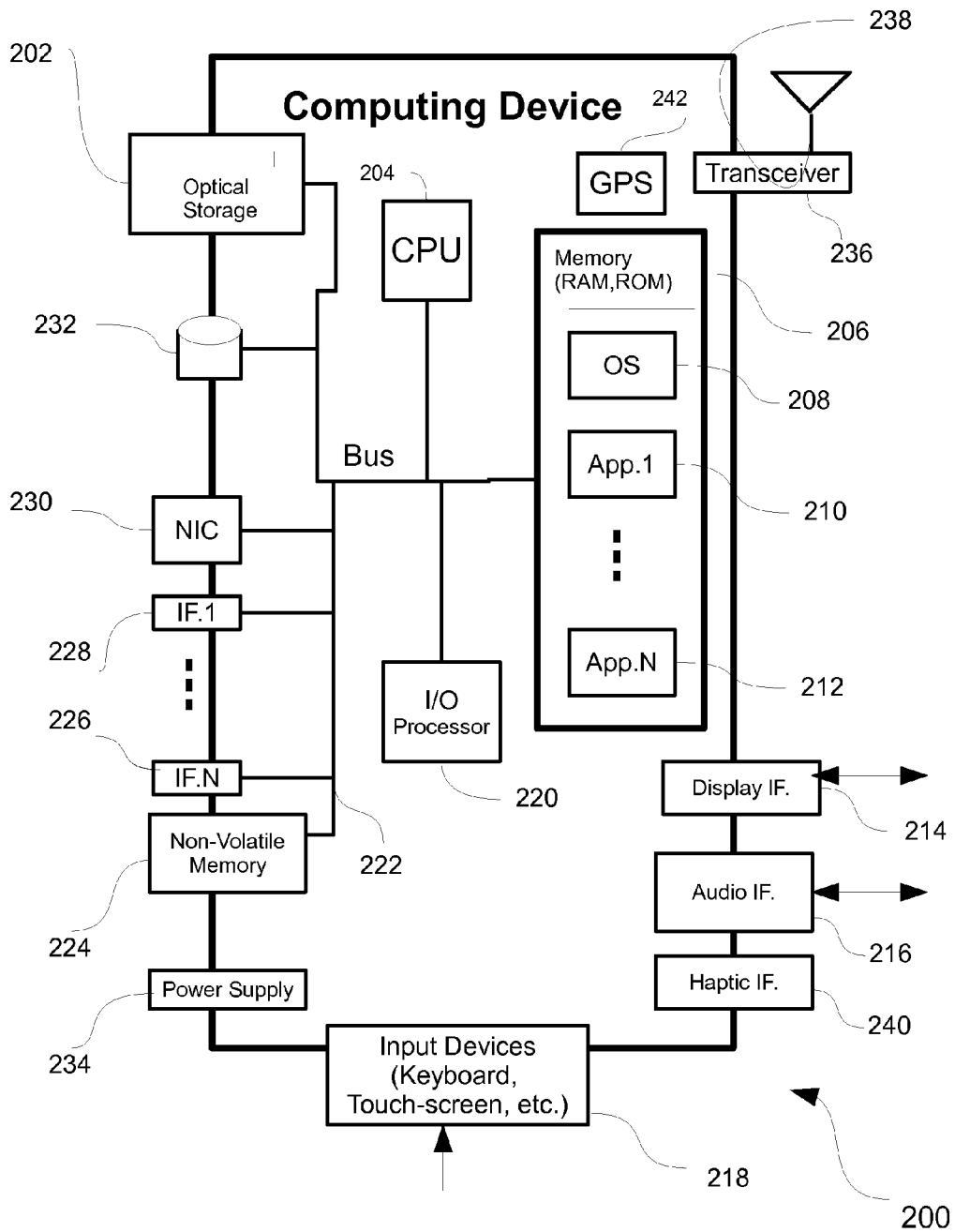
FIG. 2 shows an embodiment of a computing device that may be used in the network computing environment of FIG. 1.

FIG. 2 shows an illustrative computing device 200 that may represent any one of the server and/or client computing devices shown in FIG. 1. A computing device represented by computing device 200 may include less or more than all the components shown in FIG. 2 depending on the functionality needed. For example, a mobile computing device may include the transceiver 236 and antenna 238, while a server computing device 102 of FIG. 1 may not include these components. Those skilled in the art will appreciate that the scope of integration of components of computing device 200 may be different from what is shown. As such, some of the components of computing device 200 shown in FIG. 2 may be integrated together as one unit. For example, NIC 230 and transceiver 236 may be implemented as an integrated unit. Additionally, different functions of a single component may be separated and implemented across several components instead. For example, different functions of I/O processor 220 may be separated into two or more processing units.

With continued reference to FIG. 2, computing device 200 includes optical storage 202, Central Processing Unit (CPU) 204, memory module 206, display interface 214, audio interface 216, input devices 218, Input/Output (I/O) processor 220, bus 222, non-volatile memory 224, various other interfaces 226-228, Network Interface Card (NIC) 320, hard disk 232, power supply 234, transceiver 236, antenna 238, haptic interface 240, and Global Positioning System (GPS) unit 242. Memory module 206 may include software such as Operating System (OS) 208, and a variety of software application programs 210-212. Computing device 200 may also include other components not shown in FIG. 2. For example, computing device 200 may further include an illuminator (for example, a light), graphic interface, and portable storage media such as USB drives. Computing device 200 may also include other processing units, such as a math co-processor, graphics processor/accelerator, and a Digital Signal Processor (DSP).

Optical storage device 202 may include optical drives for using optical media, such as CD (Compact Disc), DVD (Digital Video Disc), and the like. Optical storage devices 202 may provide inexpensive ways for storing information for archival and/or distribution purposes.

Central Processing Unit (CPU) 204 may be the main processor for software program execution in computing device 200. CPU 204 may represent one or more processing units that obtain software instructions from memory module 206 and execute such instructions to carry out computations and/or transfer data between various sources and destinations of data, such as hard disk 232, I/O processor 220, display interface 214, input devices 218, non-volatile memory 224, and the like.

Memory module 206 may include RAM (Random Access Memory), ROM (Read Only Memory), and other storage means, mapped to one addressable memory space. Memory module 206 illustrates one of many types of computer storage media for storage of information such as computer readable instructions, data structures, program modules or other data. Memory module 206 may store a basic input/output system (BIOS) for controlling low-level operation of computing device 200. Memory module 206 may also store OS 208 for controlling the general operation of computing device 200. It will be appreciated that OS 208 may include a general-purpose operating system such as a version of UNIX, or LINUX™, or a specialized client communication operating system such as Windows Mobile™, or the Symbian® operating system. OS 208 may, in turn, include or interface with a Java virtual machine (JVM) module that enables control of hardware components and/or operating system operations via Java application programs.

Memory module 206 may further include one or more distinct areas (by address space and/or other means), which can be utilized by computing device 200 to store, among other things, applications and/or other data. For example, one area of memory module 206 may be set aside and employed to store information that describes various capabilities of computing device 200, a device identifier, and the like. Such identification information may then be provided to another device based on any of a variety of events, including being sent as part of a header during a communication, sent upon request, or the like. One common software application is a browser program that is generally used to send/receive information to/from a web server. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed. In one embodiment, using the browser application, a user may view an article or other content on a web page with one or more highlighted portions as target objects.

Display interface 214 may be coupled with a display unit (not shown), such as liquid crystal display (LCD), gas plasma, light emitting diode (LED), or any other type of display unit that may be used with computing device 200. Display units coupled with display interface 214 may also include a touch sensitive screen arranged to receive input from an object such as a stylus or a digit from a human hand. Display interface 214 may further include interface for other visual status indicators, such Light Emitting Diodes (LED), light arrays, and the like. Display interface 214 may include both hardware and software components. For example, display interface 214 may include a graphic accelerator for rendering graphic-intensive outputs on the display unit. In one embodiment, display interface 214 may include software and/or firmware components that work in conjunction with CPU 204 to render graphic output on the display unit.

Audio interface 216 is arranged to produce and receive audio signals such as the sound of a human voice. For example, audio interface 216 may be coupled to a speaker and microphone (not shown) to enable communication with a human operator, such as spoken commands, and/or generate an audio acknowledgement for some action.

Input devices 218 may include a variety of device types arranged to receive input from a user, such as a keyboard, a keypad, a mouse, a touchpad, a touch-screen (described with respect to display interface 214), a multi-touch screen, a microphone for spoken command input (describe with respect to audio interface 216), and the like.

I/O processor 220 is generally employed to handle transactions and communications with peripheral devices such as mass storage, network, input devices, display, and the like, which couple computing device 200 with the external world. In small, low power computing devices, such as some mobile devices, functions of the I/O processor 220 may be integrated with CPU 204 to reduce hardware cost and complexity. In one embodiment, I/O processor 220 may the primary software interface with all other device and/or hardware interfaces, such as optical storage 202, hard disk 232, interfaces 226-228, display interface 214, audio interface 216, and input devices 218.

An electrical bus 222 internal to computing device 200 may be used to couple various other hardware components, such as CPU 204, memory module 206, I/O processor 220, and the like, to each other for transferring data, instructions, status, and other similar information.

Non-volatile memory 224 may include memory built into computing device 200, or portable storage medium, such as USB drives that may include PCM arrays, flash memory including NOR and NAND flash, pluggable hard drive, and the like. In one embodiment, portable storage medium may behave similarly to a disk drive. In another embodiment, portable storage medium may present an interface different than a disk drive, for example, a read-only interface used for loading/supplying data and/or software.

Various other interfaces 226-228 may include other electrical and/or optical interfaces for connecting to various hardware peripheral devices and networks, such as IEEE 1394 also known as FireWire, Universal Serial Bus (USB), Small Computer Serial Interface (SCSI), parallel printer interface, Universal Synchronous Asynchronous Receiver Transmitter (USART), Video Graphics Array (VGA), Super VGA (SVGA), and the like.

Network Interface Card (NIC) 230 may include circuitry for coupling computing device 200 to one or more networks, and is generally constructed for use with one or more communication protocols and technologies including, but not limited to, Global System for Mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols.

Hard disk 232 is generally used as a mass storage device for computing device 200. In one embodiment, hard disk 232 may be a Ferro-magnetic stack of one or more disks forming a disk drive embedded in or coupled to computing device 200. In another embodiment, hard drive 232 may be implemented as a solid-state device configured to behave as a disk drive, such as a flash-based hard drive. In yet another embodiment, hard drive 232 may be a remote storage accessible over network interface 230 or another interface 226, but acting as a local hard drive. Those skilled in the art will appreciate that other technologies and configurations may be used to present a hard drive interface and functionality to computing device 200 without departing from the spirit of the present disclosure.

Power supply 234 provides power to computing device 200. A rechargeable or non-rechargeable battery may be used to provide power. The power may also be provided by an external power source, such as an AC adapter or a powered docking cradle that supplements and/or recharges a battery.

Transceiver 236 generally represents transmitter/receiver circuits for wired and/or wireless transmission and receipt of electronic data. Transceiver 236 may be a stand-alone module or be integrated with other modules, such as NIC 230. Transceiver 236 may be coupled with one or more antennas for wireless transmission of information.

Antenna 238 is generally used for wireless transmission of information, for example, in conjunction with transceiver 236, NIC 230, and/or GPS 242. Antenna 238 may represent one or more different antennas that may be coupled with different devices and tuned to different carrier frequencies configured to communicate using corresponding protocols and/or networks. Antenna 238 may be of various types, such as omni-directional, dipole, slot, helical, and the like.

Haptic interface 240 is configured to provide tactile feedback to a user of computing device 200. For example, the haptic interface may be employed to vibrate computing device 200, or an input device coupled to computing device 200, such as a game controller, in a particular way when an event occurs, such as hitting an object with a car in a video game.

Global Positioning System (GPS) unit 242 can determine the physical coordinates of computing device 200 on the surface of the Earth, which typically outputs a location as latitude and longitude values. GPS unit 242 can also employ other geo-positioning mechanisms, including, but not limited to, triangulation, assisted GPS (AGPS), E-OTD, CI, SAI, ETA, BSS or the like, to further determine the physical location of computing device 200 on the surface of the Earth. It is understood that under different conditions, GPS unit 242 can determine a physical location within millimeters for computing device 200. In other cases, the determined physical location may be less precise, such as within a meter or significantly greater distances. In one embodiment, however, a mobile device represented by computing device 200 may, through other components, provide other information that may be employed to determine a physical location of the device, including for example, a MAC address.

Figure 3:
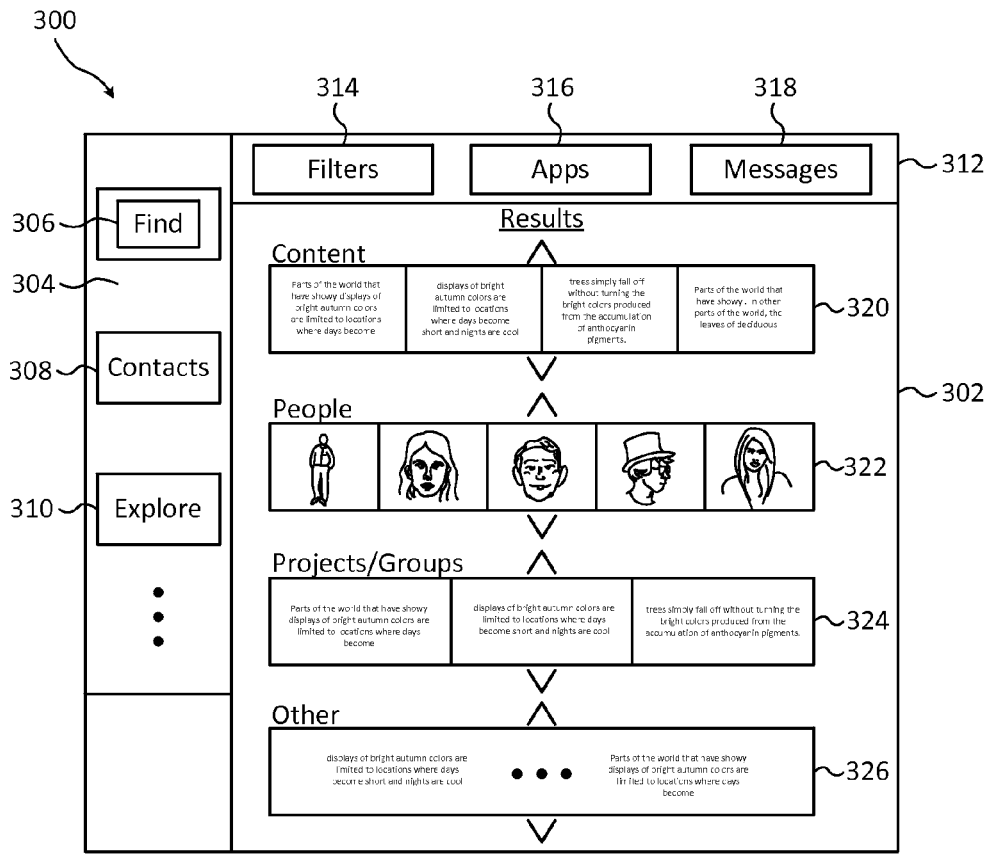
FIG. 3 shows an example graphical user interface on a computing device of FIGS. 1 and 2 displaying multiple information panels.

FIG. 3 shows an example graphical user interface on a computing device of FIGS. 1 and 2 displaying multiple information panels. In various embodiments, Graphical User Interface (GUI) 300 includes search results 302; side control panel 304 including controls for search 307, contacts 308, explore 310, and the like; top control panel 312 including controls for selecting filters 314, apps (small software applications) 316, and viewing messages 318. The GUI 300 may further include multiple windows for showing different types of search results such as content 320, people 322, projects and groups 324, and other windows 326.

In various embodiments, a user may search for some information on the Internet which may result in many links, materials, images, advertisements, and the like. The user may also search an enterprise intranet for internal information which may result in the return of relevant information about people, projects, groups, and the like. In the general case, the search results may fall into many categories, which categories may be defined by the system, the search engine or application, the user, the administrator, and the like. Each such information category may be further displayed in a separate, non-overlapping window controlled independently via its own control components, such as buttons, links, lists, checkboxes, radio buttons, scroll bars, and the like. In FIG. 3, the scroll capability of each information window or panel is shown by the arrows above and below each of the panels 320-326.

In various embodiments, information panels 320-326 may be data files associated with particular applications. For example, for a project, a user may need several related files. As such, panel 320 may include a Microsoft Word™ file, panel 322 may include an Excel™ file, panel 324, may include a contact list for the project, panel 326 may include a project webpage, and the like. These related files which may be opened and used simultaneously by the user may be included in a parallax list so that the user may be able to quick change focus and scroll through these files using the parallax GUI.

Parallax scrolling is a computer graphics technique for providing an illusion of three-Dimensional (3D) motion on a 2D screen. Generally, in parallax techniques, multiple layers are used to represent multiple depths of view. The layer corresponding to the farthest background (farthest away from the user's point of view) is moved the most slowly while the layer corresponding to the closest foreground is moved the fastest, creating the illusion of depth for the user's visual depth perception. This is akin to traveling in a car or train and looking at the horizon. The objects closest to the car or train, such as light or telephone poles appear to move fastest past the user's view, while objects a great distance away, such as mountains, appear to be almost not moving or moving very slowly. This apparent change of speed of movement of objects according to the distance from the viewer is the basis of creating the illusion of depth using merely varying speeds of motion of layers in a 2D image.

In various embodiments, parallax scrolling in a GUI window or panel of information may be used to automatically move panels which are not the current focus of the user's attention out of the way when the user is scrolling through a selected focus panel. With continued reference to FIG. 3, each information panel 320-326 occupies a piece of the screen of the computing device, thus, limiting the user's ability to see more of what he is focusing on. Even though the panels can be independently scrolled, the user can only use a small portion of the screen at a time to view his selected focus panel. By moving the other panels out of the way in an automatic and smooth fashion, the user is provided more of the screen to view his selected information. This technique is further described below with respect to FIGS. 5A to 7B.

Figure 4:
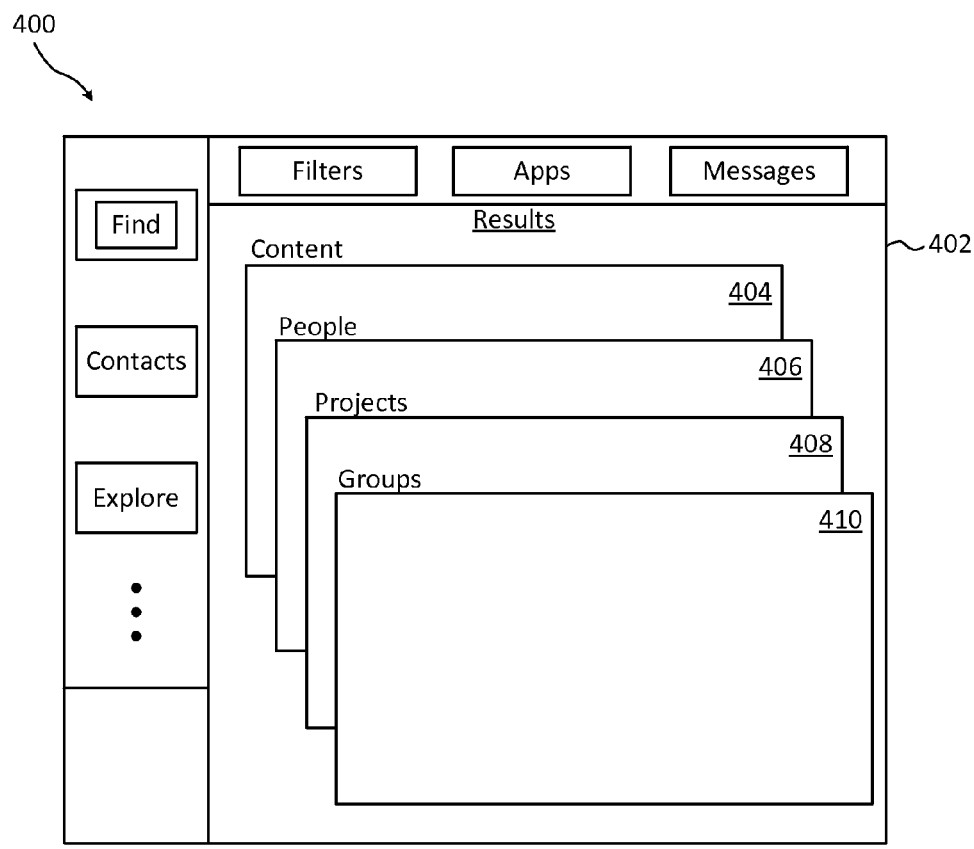
FIG. 4 shows an example graphical user interface displaying multiple overlapping and scrollable information panels.

FIG. 4 shows an example graphical user interface displaying multiple overlapping and scrollable information panels. In various embodiments, GUI 400 includes search results 402 in overlapping windows 404, 406, 408, and 410.

In various embodiments, as each overlapping window is selected, it comes to the foreground and the non-focus windows are sent to the background. The selected focus window may also be made full-screen, in which case the user has to actively reduce the focus window size or minimize it to view the other windows or change the focus window. As described with respect to FIG. 3, windows 404-410 may be used to display categorized search results, various data files, project files, or any other information or content.

In various embodiments, random windows may be registered or included to be used with parallax GUI. In some embodiments, the registration of the content, such as a file, in a parallax list may be performed by assigning a parallax attribute to the content. In other embodiments, a designated parallax area may be provided on the screen to drag and drop the file and make it part of the parallax GUI while the file is in use. In still other embodiments, a context sensitive menu may be used to enlist the file in the parallax GUI. Those skilled in the art will appreciate that there are many ways to include contents, such as files and other content, in the parallax GUI without departing from the spirit of the present disclosure. For example in some embodiments, the full pathname of the file may be included in a data file, database, registry, or other information repository to be included in the parallax GUI.

In various embodiment, these overlapping windows may also be effectively handled using the parallax GUI, as further described below with respect to FIGS. 5A to 7B.

Figure 5A:
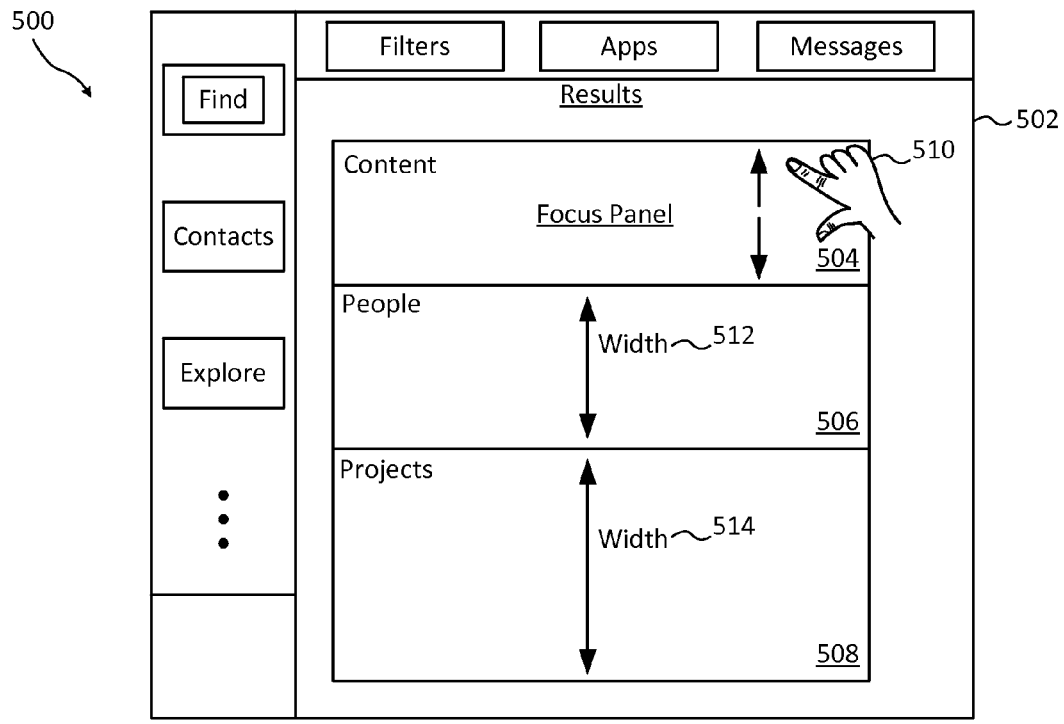
FIG. 5A shows an example touch-sensitive screen with graphical user interface displaying multiple overlapping information panels prior to scrolling a top panel.

FIG. 5A shows an example touch-sensitive screen with graphical user interface displaying multiple overlapping information panels prior to scrolling a top panel. In various embodiments, parallax GUI 500 includes results 502 with information panels 504, 506, and 508. Prior to parallax scrolling by user's hand 510, panels 504, 506, and 508 each have a visible portion of some corresponding width on the screen such as panel widths 512 and 514. Parallax GUI 500 is shown with three information panels for illustration purposes only. Any number of information panels may be used in substantially the same way and with substantially the same results.

In various embodiments, the width of the non-focus panels shrink in some relation to the scrolling motion of the user, until they disappear from the user's sight. When the user scrolls in the opposite direction, the non-focus panels are automatically and gradually returned to the pre-scroll configuration. At this time, the user may select another focus panel and repeat the process with the new focus panel.

The parallax scrolling process behaves slightly differently depending on the position of the focus panel in the set of information panels on the screen. There are generally three positions that a panel may occupy: top, middle, and bottom. Those skilled in the art will appreciate that on a computer screen orientation is relative and "top and bottom" and "left and right" are similar and the differences are a matter of relative semantics. This orientation relativity is particularly applicable to mobile devices. As such, what is described below with respect to "top" and "bottom" apply equally to "left" and "right."

Figure 5B:
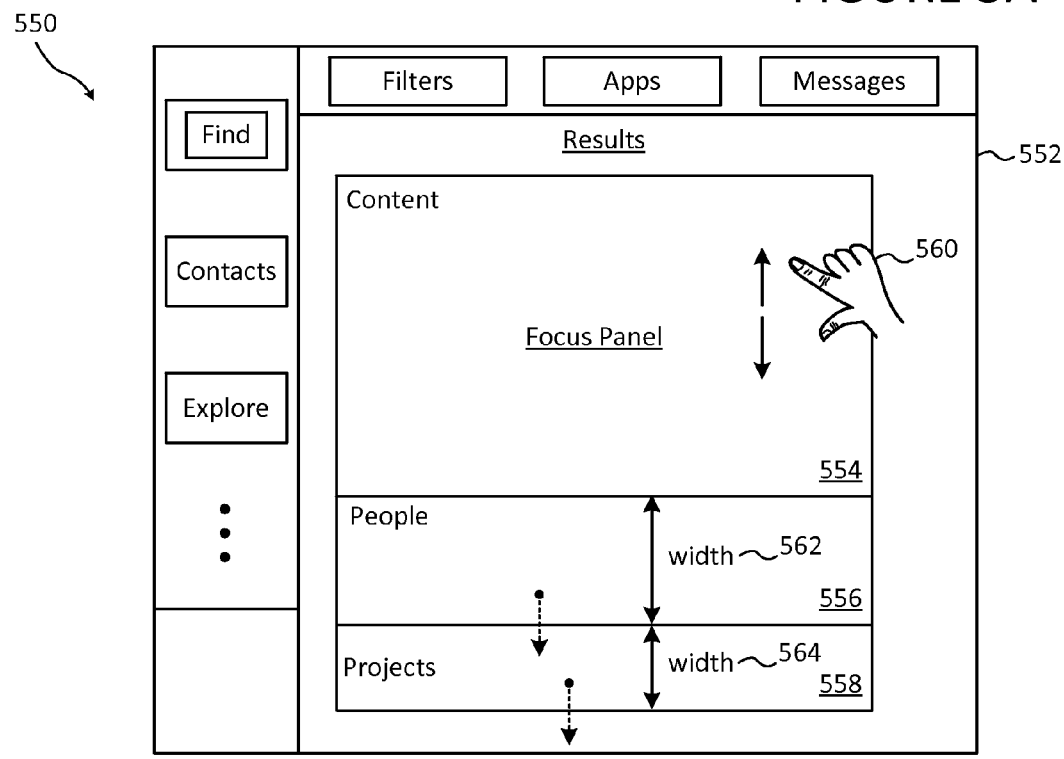
FIG. 5B shows the example touch-sensitive screen of FIG. 5A with graphical user interface displaying multiple overlapping information panels after scrolling the top panel by a user.

FIG. 5B shows the example touch-sensitive screen of FIG. 5A with graphical user interface displaying multiple overlapping information panels after scrolling the top panel by a user. In various embodiments, parallax GUI 550 includes results 552 with information panels 554, 556, and 558. User's hand 560 may select a focus panel for scrolling.

In various embodiments, the user may scroll the top focus panel 554 in a direction that allows viewing more of the hidden information in the focus panel. In some embodiments, the user may use a fingertip on the touch screen of his computing device to start moving the contents of the focus panel past the screen. As the apparent movement of data begins, the parallax GUI starts to shrink the other panels' width and/or slide the panels in the direction towards the bottom of the screen away from the top panel, thus, providing more screen area to view the focus panel. This is signified by the dotted arrows in FIG. 5B. Those skilled in the art will appreciate that the non-focus panels may be moved or shrunk in a different direction than the direction of scroll of the focus panel. For example, the non-focus panels may be moved to the left or the right before they disappear, instead of top or bottom.

After a few scrolling strokes with the fingertip, the non-focus panels will completely disappear and effectively make the focus panel occupy the full screen. Now the user can keep scrolling the focus panel in the same direction indefinitely.

If the user starts scrolling back the contents of the focus panel in the opposite direction, when the contents of the focus panel get near the starting state prior to scrolling, the parallax GUI starts revealing the hidden panels and restoring the screen configuration the pre-scroll state. This way, scrolling back by the user on the focus panel causes the parallax GUI to make the non-focus panels to reappear as before.

In various embodiments, the parallax GUI synchronizes the speed of sliding and/or vanishing the non-focus panels to the speed of user's scrolling of the focus panel. That is, the faster the user scrolls, the faster the non-focus panels slide away and disappear from view. This method allows responsive interaction with user's actions. If the user wants to scroll fast, the non-focus panels disappear in a similarly quick manner to enhance performance and user experience. Those skilled in the art will appreciate that the speed of disappearing of the non-focus panels may be a function of other user scroll characteristics than just speed. For example, the user's scroll acceleration may be used to determine the speed or acceleration of sliding or reducing/hiding the non-focus panels.

In various embodiments, the scrolling may be initiated with a non-touch screen pointing device such as a mouse or a touch-pad. The scrolling may also be performed with other touch gestures such as two- or three-fingered gestures that may allow simultaneous scrolling, enlarging, and changing other attributes of the content or screen, such as increasing the screen backlight.

After the scrolling of the focus panel starts and the focus panel is placed in a full-screen mode occupying the entire results area 502, the non-focus panels disappear from view, as described previously. At this point, the user may wish to switch to another non-focus panel to start viewing and/or scrolling the contents of the other non-focus panel. Switching from one focus panel to another may be performed in various ways. In various embodiments, a portion of the control panels 304 and/or 312, shown in FIG. 3, may be used to display a thumbnail image or icon and/or a title of all panels and/or files currently in the parallax GUI. The user may simply switch to another panel by selecting the corresponding thumbnail image or icon in the control panels. In other embodiments, the user may use a touch gesture, such as double tapping the screen, to go to the pre-scroll state in which all panels or files are visible and he can select another panel for scrolling. Similarly, a mouse double-click may be used when using non-touch screen devices. Those skilled in the art will appreciate that many other methods of switching between panels may be employed without departing from the spirit of the present disclosures. For example, the user select an ID number of the panel he wishes to switch to from a pick-list on the parallax GUI.

Figure 6A:
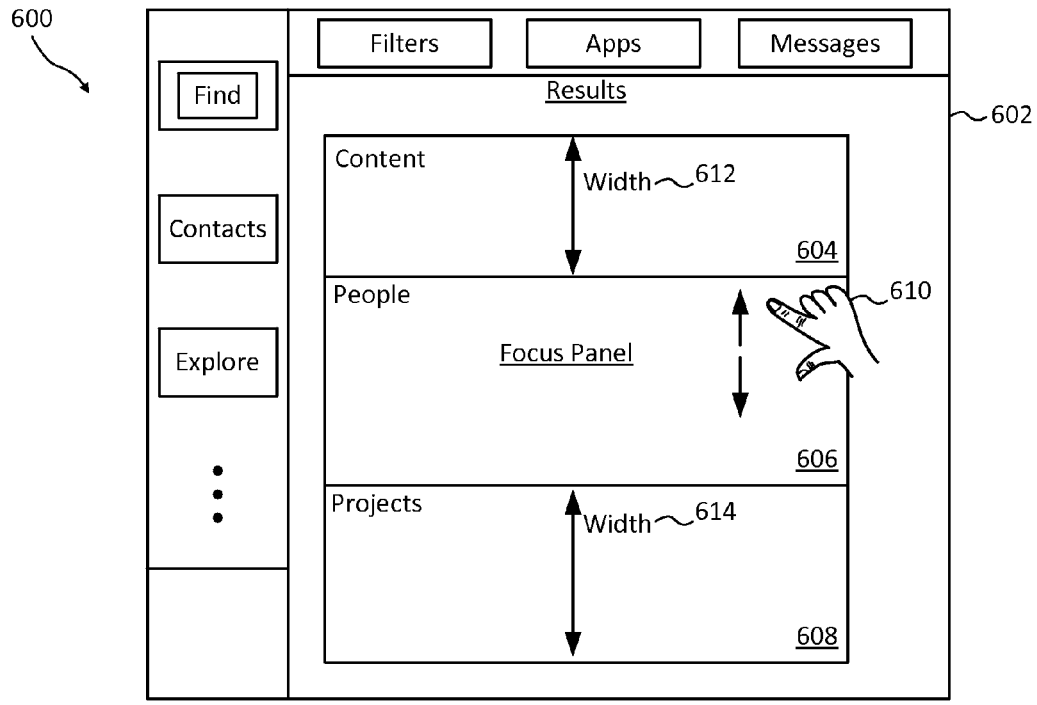
FIG. 6A shows the example touch-sensitive screen of FIG. 5A with graphical user interface displaying multiple overlapping information panels prior to scrolling a middle panel by the user.

FIG. 6A shows the example touch-sensitive screen of FIG. 5A with graphical user interface displaying multiple overlapping information panels prior to scrolling a middle panel by the user. In various embodiments, parallax GUI 600 includes results 602 with information panels 604, 606, and 608. Prior to parallax scrolling by user's hand 610, panels 604, 606, and 608 each have a visible portion of some corresponding width on the screen such as panel widths 612 and 614.

Parallax GUI 600 is substantially similar to parallax GUI 500 described with respect to FIG. 5A, except that the focus panel 606 is in the middle of the information panels 604-608.

Figure 6B:
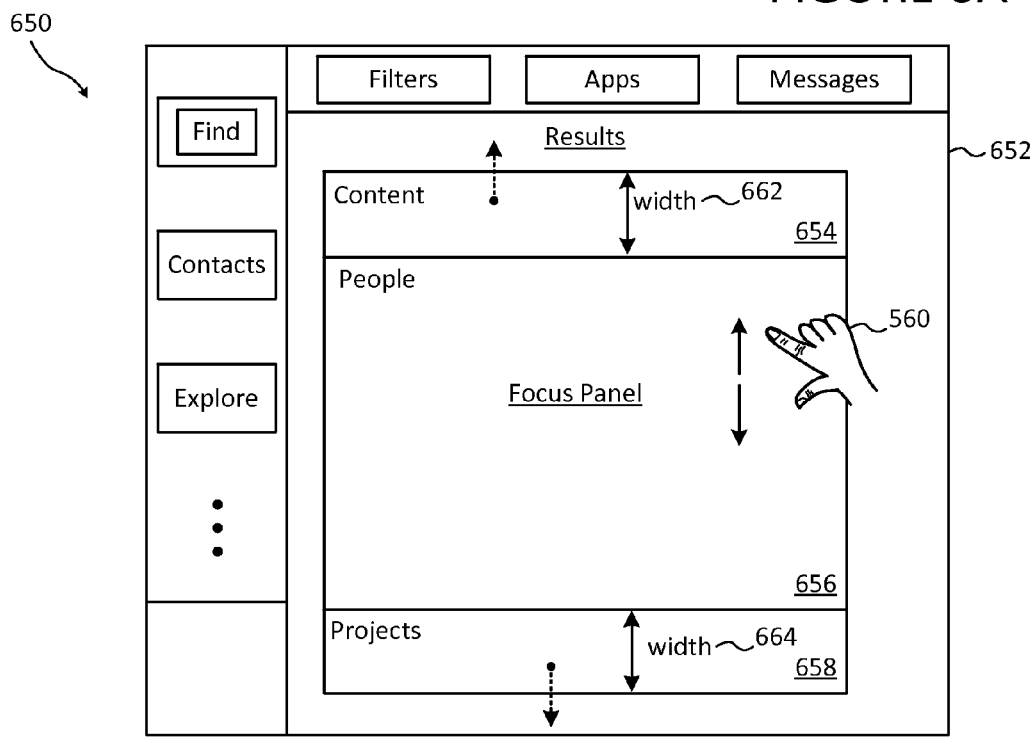
FIG. 6B shows the example touch-sensitive screen of FIG. 5A with graphical user interface displaying multiple overlapping information panels after scrolling the middle panel by the user.

FIG. 6B shows the example touch-sensitive screen of FIG. 5A with graphical user interface displaying multiple overlapping information panels after scrolling the middle panel by the user. In various embodiments, parallax GUI 650 includes results 652 with information panels 654, 656, and 658. User's hand 660 may select a focus panel for scrolling.

Parallax GUI 650 is substantially similar to parallax GUI 500 described with respect to FIG. 5A, except that the focus panel 656 is in the middle of the information panels 654-658. The parallax scrolling works substantially similarly as described with respect to FIG. 5A, however, the non-focus panels are now located both above and below the focus panel 656. As the user begins scrolling the focus panel, the non-focus panels above the focus panel start shrinking and/or sliding towards the top, while the non-focus panels below the focus panel start shrinking and/or sliding towards the bottom, as signified by the dotted arrows on the non-focus panels.

Figure 7A:
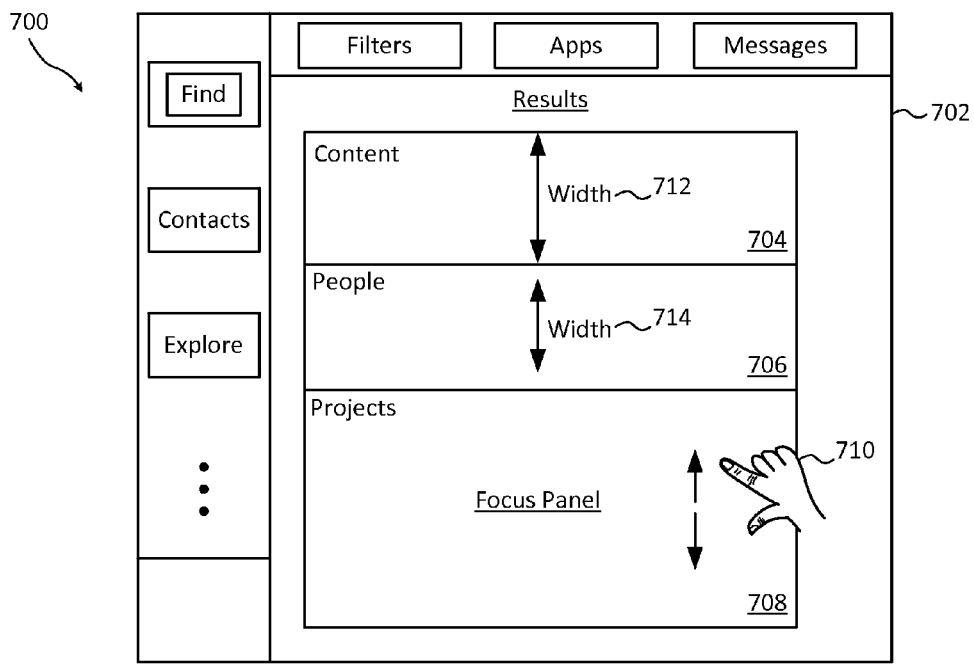
FIG. 7A shows the example touch-sensitive screen of FIG. 5A with graphical user interface displaying multiple overlapping information panels prior to scrolling a bottom panel by the user.

FIG. 7A shows the example touch-sensitive screen of FIG. 5A with graphical user interface displaying multiple overlapping information panels prior to scrolling a bottom panel by the user. In various embodiments, parallax GUI 700 includes results 702 with information panels 704, 706, and 708. Prior to parallax scrolling by user's hand 710, panels 704, 706, and 708 each have a visible portion of some corresponding width on the screen such as panel widths 712 and 714.

Parallax GUI 700 is substantially similar to parallax GUI 500 described with respect to FIG. 5A, except that the focus panel 708 is at the bottom of the information panels 704-708.

Figure 7B:
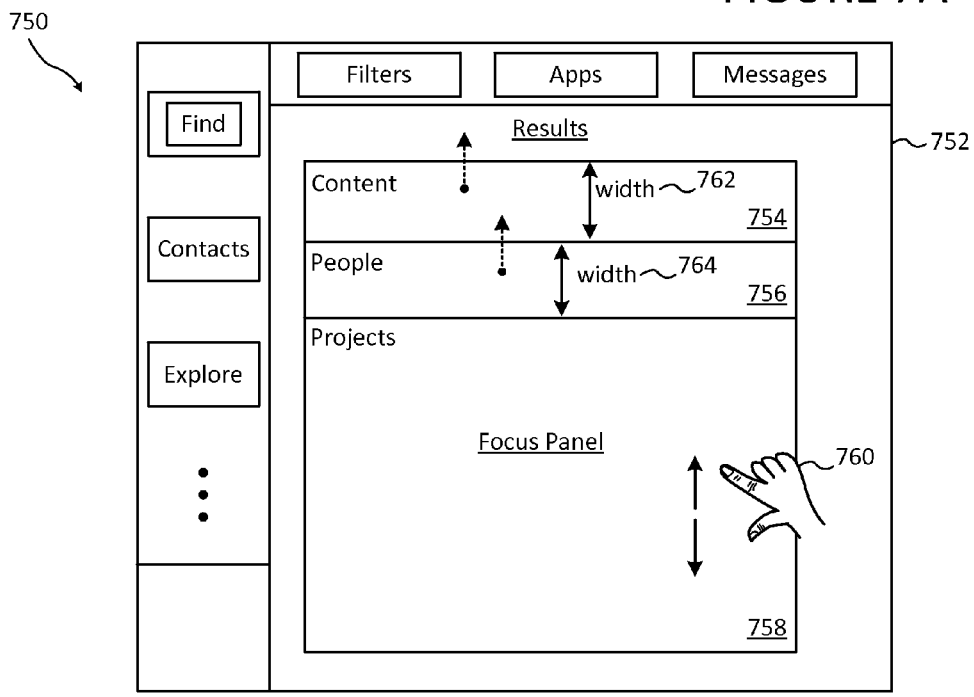
FIG. 7B shows the example touch-sensitive screen of FIG. 5A with graphical user interface displaying multiple overlapping information panels after scrolling the bottom panel by the user.

FIG. 7B shows the example touch-sensitive screen of FIG. 5A with graphical user interface displaying multiple overlapping information panels after scrolling the bottom panel by the user. In various embodiments, parallax GUI 750 includes results 752 with information panels 754, 756, and 758. User's hand 760 may select a focus panel for scrolling.

Parallax GUI 650 is substantially similar to parallax GUI 500 described with respect to FIG. 5A, except that the focus panel 758 is at the bottom of the information panels 754-758. The parallax scrolling works substantially similarly as described with respect to FIG. 5A, however, the non-focus panels are now located above the focus panel 758. As the user begins scrolling the focus panel, the non-focus panels above the focus panel start shrinking and/or sliding towards the top, as signified by the dotted arrows on the non-focus panels.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A computer comprising:
    a computing device;
    an input device;
    a display device;
    a parallax Graphical User Interface (GUI) software component that when executed on the computing device causes the computing device to:
    detect a scrolling action of a user, using the input device, on a focus information panel of a plurality of information panels displayed on the display device;
    scroll information content of the focus information panel in a first direction on the display device;
    gradually and based on the direction of scroll of information content in the focus information panel shrink and slide the other information panels of the plurality of the information panels out of the way of the focus information panel on the display device to yield more area of the display device to the focus information panel and causing the other information panels of the plurality of the information panels to eventually disappear from a view of the user on the display device; and
    wherein scrolling back the information content in the focus information panel in an opposite direction by the user causes the parallax GUI software component to make the other information panels to reappear and causes the display device to yield less area of the display device to the focus information panel.

2. The computer and the parallax GUI software component of claim 1 that when executed on the computing device further causes the computing device to determine a position of the focus information panel within the plurality of the information panels.

3. The computer and the parallax GUI software component of claim 2, wherein the determined position of the focus information panel includes at least a top, a middle, and a bottom position.

4. The computer and the parallax GUI software component of claim 2, wherein the other information panels are slid out of the way in a direction based on the determined position of the focus information panel.

5. The computer and the parallax GUI software component of claim 4, wherein the other information panels are slid out of the way based on a parallax technique.

6. The computer and the parallax GUI software component of claim 1, wherein the plurality of information panels include categorized search results.

7. The computer and the parallax GUI software component of claim 1, wherein the plurality of information panels include files registered for use with the parallax GUI software component.

8. A method of viewing information on a computing device, the method comprising:
    detecting a scrolling action of a user on a focus information panel of a plurality of information panels;
    scrolling information content of the focus information panel in a first direction;
    gradually and based on the direction of scroll of information content in the focus information panel shrinking and sliding the other information panels of the plurality of the information panels out of the way of the focus information panel on a display device to yield more area of the display device to the focus information panel and causing the other information panels of the plurality of the information panels to eventually disappear from a view of the user; and
    wherein scrolling back the information content in the focus information panel in an opposite direction by the user causes the other information panels to reappear and causes the display device to yield less area of the display device to the focus information panel.

9. The method of claim 8, further comprising determining a position of the focus information panel within the plurality of the information panels.

10. The method of claim 9, wherein the determined position of the focus information panel includes at least a top, a middle, and a bottom position.

11. The method of claim 8, wherein the other information panels are slid out of the way based on a parallax technique.

12. The method of claim 8, wherein the plurality of information panels include categorized search results.

13. The method of claim 8, wherein the plurality of information panels include files registered for use with a parallax graphical user interface software component.

14. A method of managing electronic data, the method comprising:
    detecting a scrolling action on a focus information panel of a plurality of information panels;
    determining a position of the focus information panel within the plurality of information panels;
    gradually and based on the direction of the scroll of information content in the focus information panel shrinking and sliding the other information panels of the plurality of the information panels out of the way of the focus information panel on a display device, to yield more area of the display device to the focus information panel, in a direction based on the position of the focus information panel within the plurality of the information panels; and
    wherein scrolling back the information content in the focus information panel in an opposite direction by the user causes the other information panels to reappear and causes the display device to yield less area of the display device to the focus information panel.

15. The method of claim 14, further comprising using a parallax Graphical User Interface software component to slide the other information panels out of the way based on a parallax technique.

16. The method of claim 14, wherein determining the position of the focus panel comprises determining whether the focus panel is at the top, in the middle, or at the bottom of the plurality of the information panels.

17. The method of claim 14, wherein the information panels include categorized search results.

18. The method of claim 14, further comprising causing the other information panels to slide back to their original positions if the focus information panel is scrolled back.

* * * * *